United States Patent Office 3,826,767
Patented July 30, 1974

3,826,767
ANIONIC DEXTRAN GRAFT COPOLYMERS
Merwin Frederick Hoover, Pittsburgh, Gloria Di Marco Sinkovitz, Bridgeville, and Raymond Joseph Schaper, Pittsburgh, Pa., assignors to Calgon Corporation, Pittsburgh, Pa.
No Drawing. Filed Jan. 26, 1972, Ser. No. 221,103
Int. Cl. C08b 25/04; C08f 25/00
U.S. Cl. 260—17.4 GC          5 Claims

ABSTRACT OF THE DISCLOSURE

Novel anionic graft copolymers of acrylamide and/or certain polymerizable anionic monomers grafted onto a dextran substrate are disclosed.

BACKGROUND OF THE INVENTION

The present invention is directed to novel, anionic graft copolymers of acrylamide and/or certain polymerizable anionic monomers grafted onto a dextran substrate. These graft copolymers find application in the papermaking art as dry strength additives. In addition, they are useful as flocculants for solids liquid separation processes.

In the past, anionic homopolymers and copolymers have found application in many areas. For example, copolymers of acrylamide and acrylic acid have been used widely in the papermaking art and in solids liquid separation processes. More recently, polymers containing 2-acrylamido-2-methylpropane sulfonic acid have been used as retention and drainage aids in the papermaking industry and as flocculants in the mining industry. However, heretofore, graft copolymers of anionic monomers onto a dextran substrate have not been known or used.

The composition and use of cationic dextran graft copolymers is disclosed in a copending application of Hoover et al., "Cationic Dextran Graft Copolymers as Dry Strength Additives for Paper," filed Sept. 22, 1971, Ser. No. 182,898, now U.S. Pat. No. 3,734,820, issued May 22, 1973.

SUMMARY OF THE INVENTION

We have found novel graft copolymers of acrylamide and/or polymerizable anionic monomers. The graft copolymers of our invention have two basic components, (1) a dextran substrate, and (2) a polymerizable anionic monomer. The graft copolymers consist of from 5 to 97.5 percent by weight of the dextran substrate and the remaining percentage being derived from one or more of the polymerizable anionic monomers.

The preferred polymers of our invention have an additional component comprising acrylamide (or methacrylamide). The preferred compounds are graft copolymers of (1) a dextran substrate, (2) acrylamide, and (3) one or more polymerizable anionic monomers. These polymers consist of from 5 to 97.5 percent by weight of the dextran substrate and the remaining percentage being derived from acrylamide and the polymerizable anionic acrylic monomers. The acrylamide should be at least 5 percent but no more than 75 percent of the remainder. Therefore, the preferred polymers consist of 5 to 97.5 percent by weight of the dextran substrate, from about 0.125 to about 71 percent by weight acrylamide and the remainder the polymerizable anionic monomers.

The dextran useful in our invention is a naturally occurring polymer having a molecular weight between 20,000 and 50,000,000 or higher. The general structure is illustrated below.

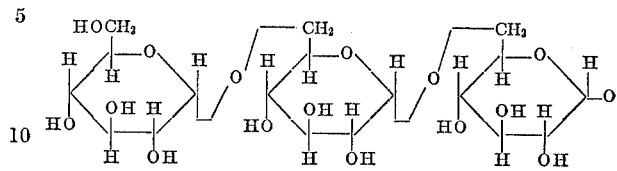

As mentioned above, the monomers useful in preparing the graft copolymers of our invention are the free radical polymerizable acrylic monomers. These monomers are well reported in the literature and are known to readily undergo free radical polymerization.

Our invention contemplates three types of polymerizable monomers. These types are acrylic, vinylic and allylic (methallylic). The invention also contemplates three classes of anionic monomers. These classes of monomers are the carboxylic acids, the sulfonic acids, and the phosphonic acids and their water-soluble salts. The term acid as used herein is inclusive of the water-soluble salts. The preferred water-soluble salts are the ammonium and alkali metal salts.

Some examples of the useful and preferred carboxylic acids are acrylic acid (or its equivalent made via hydrolyzed polyacrylamide), methacrylic acid (or its hydrolyzed equivalent), crotonic acid, itaconic acid, furfurylacrylic acid, allyl acetic acid, and fumaric acid.

Some examples of the useful and preferred sulfonic acids are styrene sulfonic acid, 2-acrylamido-2-methylpropane sulfonic acid, vinyl sulfonic acid, 2-sulfoethyl methacrylate, 2-hydroxymethacryloxypropyl sulfonic acid, allyl sulfonic acid, and methallyl sulfonic acid.

An example of the useful and preferred phosphonic acid is vinyl phosphonic acid.

It is also within the scope of this invention to use a combination of two or more of the various polymerizable anionic monomers.

There are many well known methods of grafting various monomers onto carbohydrate-type substrates as is realized by one skilled in the art. The method ultimately chosen is not important so long as it yields a graft polymer onto the dextran. The method which we used is the ceric salt redox system. It is known that certain ceric salts form a redox system when coupled with certain reducing agents such as alcohol, aldehydes, or amines. The reaction proceeds by a single electron transfer step, resulting in cerous ion and a partially oxidized reducing agent in free radical form; the free radical being formed on the dextran substrate backbone. If a monomer is present, polymerization will occur. However, since the free radical is on the substrate backbone, only graft polymers will be formed without contamination of other polymers. Using this method, we have prepared various graft copolymers with dextran. However, the same copolymers may be prepared using any other of the well known grafting techniques. The examples below illustrate the preparation of some of the dextran graft copolymers of our invention.

Example I

A dextran graft copolymer of 2-acrylamido-2-methylpropane sulfonic acid and acrylamide having a weight percentage of 40 percent dextran, 30 percent 2-acrylamido-2-methylpropane sulfonic acid and 30 percent acrylamide was prepared as follows. The reagents used were 8 grams of dextran having an average molecular weight of about 50 million, 6 grams of acrylamide, 6 grams of 2-acrylamido-2-methylpropane sulfonic acid, 178 grams water, and 2 milliliters of a 0.1 normal ceric ammonium nitrate solution in one normal nitric acid. Into a 250 milliliter, four-necked flask equipped with purge tube, thermometer, stirrer and condenser was added the dextran, monomers, and 178 grams of water. The reaction mixture was purged with nitrogen for one hour at 30° C. Then the ceric catalyst solution was added and the reaction exothermed. The reaction mixture was then stirred for two and one half hours at about 31° C. The resulting polymer was diluted with water and precipitated from acetone.

Example II

A 20 percent dextran, 60 percent acrylamide, 20 percent acrylic acid graft copolymer was prepared in the following manner. Into a one liter flask equipped with purge tube, thermometer, stirrer and condenser was added 10 grams of dextran and 450 grams of water. The dextran solution was purged with nitrogen for one hour at 30° C. Then 10 grams of acrylic acid were added and the mixture stirred for five minutes. The acrylamide was then added and the resulting mixture stirred for an additional five minutes. Five milliliters of the ceric catalyst was added (same as in Example I) and the reaction mixture stirred for three hours. The resulting polymer was diluted with water and precipitated from acetone.

Example III

A 40 percent dextran, 54 percent acrylamide, 6 percent 2-acrylamido-2-methylpropane sulfonic acid graft copolymer was prepared as follows. Into a 500 milliliter flask equipped with purge tube, thermometer, stirrer and condenser was added 8 grams of high molecular weight dextran and 125 grams of water. The dextran solution was heated to 30° C. and purged for one hour with nitrogen. Meanwhile, 10.8 grams of acrylamide and 1.2 grams of 2-acrylamido-2-methylpropane sulfonic acid were dissolved in 50 milliliters of water. This solution was then added to the dextran solution. Then 5 milliliters of the ceric catalyst solution was added and the reaction mixture exothermed to about 35° C. The reaction mixture was then held at about 33° C. for about three hours. The resulting polymer was diluted with water and precipitated from acetone.

We have prepared many additional graft copolymers using various other monomers, various weight ratios of dextran to monomer, and various weight ratios of the different comonomers. The graft copolymers of our invention consist of from 5 to 97.5 percent by weight of the dextran substrate and the remaining percentage as defined above.

The anionic detxran graft copolymers of our invention were evaluated for their ability to impart dry strength to paper. In addition, they were evaluated as retention and drainage aids in the paper making process and as flocculants in the mining industry.

The retention performance was evaluated by incorporating the polymer into the fibers prior to sheet formation, making the sheets with a Noble Wood hand machine and ashing the sheets. The percent retention was obtained by dividing the percent ash found in the sheet by the percent filler added to the pulp. The following furnish system and conditions were used in evaluating the anionic dextran graft polymers. The furnish was a 50/50 hardwood/softwood kraft pulp. The hardwood and softwood pulps were separately beaten to 530 milliliters Schopper Reigler freeness and then mixed. The consistency of the pulp was 1.7 percent by weight. The additives used were 20 pounds per ton of rosin size, 40 pounds per ton of alum and 10 percent by weight clay based on the weight of the dry pulp. The rosin size, alum, and clay were added after beating and before headbox dilution. The sheets were prepared using a headbox consistency of 0.214 percent. The pH of the headbox and sheet mold was 4.7 (adjusted with 0.5 N $H_2SO_4$). The polymers were added at the headbox as a 0.1 percent by weight aqueous solution and thoroughly mixed with a Fisher Dyna Mix at a setting of 1.5 for 30 seconds. The feed rate of the polymer was 0.5 pounds per ton. Each sheet had a weight of about 2 grams which is equivalent to about 30 pounds per 3,000 ft.$^2$. After preparation, the sheets were dried, weighed, and burned in a crucible with a flame. Then the sheets were ashed in an oven at 900° C. for 1.5 hours. After this, they were cooled to room temperature in a desiccator and reweighed and the percent retention calculated. The results are shown in Table I.

TABLE I.—CLAY RETENTION OF ANIONIC DEXTRAN GRAFT COPOLYMERS

| Composition | Percent | |
|---|---|---|
| | Ash | Retention |
| No additive | 3.64 | 40.0 |
| 30/30/40 AM/AS/dextran | 4.27 | 46.9 |
| Do | 4.52 | 49.7 |

NOTE.—AM is acrylamide and AS is 2-acrylamido-2-methylpropane sulfonic acid.

The anionic dextran graft copolymers of our invention were evaluated for their dry strength in alkaline media and in acidic media. The polymers were evaluated by preparing a series of hand sheets on a Noble Wood machine. The hand sheets were then conditioned at 50 percent RH for a minimum of twenty-four hours at 70° F. and then tested for burst and tensile strength. The strength values were reported as a percent increase over the control. The control was a hand sheet prepared under similar conditions except dry strength additives were employed.

The pulp stock used in preparing the hand sheets was bleached, hardwood sulfite pulp. The freeness was 650 cc. Schopper Riegler. When using acid medium, 2 percent alum was also employed. However, when using alkaline medium, no additional additives other than the dry strength compound were used. The hand sheets prepared had a sheet weight of about three grams per sheet, which is approximately equivalent to forty-five pounds per 3,000 ft.$^2$. The dry strength compounds were added at the headbox and mixed there for three minutes. When running under acid media, the headbox and sheet mold pH was adjusted to 4.7 with 0.5 N $H_2SO_4$. When running under alkaline conditions, they were left unadjusted which was a pH of about 7.9. The sheets were dried for five minutes at 230° F. before conditioning and evaluating. The burst strength was tested by a Mullen Tester according to TAPPI standard test procedure T403. The tensile strength was tested by a TMI instrument in accordance with TAPPI standard test procedure T404. The following table illustrates the results of our invention in improving dry strength.

TABLE II.—DRY STRENGTH

| Composition | pH | Percent Increase | |
|---|---|---|---|
| | | Burst | Tensile |
| 30/30/40 AM/AS/dextran | Acidic | 18.9 | 8.7 |
| | Basic | 5.4 | 8.1 |

We have also evaluated various other anionic dextran graft copolymers. The results of the evaluation showed that the anionic dextran graft copolymers increase the dry strength of paper. In addition, our dextran graft polymers may be used as retention aids for the paper industry.

We claim:

1. A graft copolymer consisting essentially of the reaction product of a dextran substrate having a molecular weight of at least 20,000 to 50,000,000, acrylamide, and one or more free radical polymerizable anionic monomers selected from the group consisting of vinylic sulfonic acids and the water soluble salts thereof, said dextran substrate constituting from 5 to 97.5 percent by weight of the copolymer and said acrylamide constituting from 0.125 to 71 percent by weight of the copolymer.

2. A graft copolymer as in Claim 1 wherein the polymerizable anionic monomer is selected from one or more monomers of the group consisting of 2-sulfoethylmethacrylate, 2-hydroxymethacryloxy-propyl sulfonic acid, 2-acrylamido-2-methylpropane sulfonic acid and styrene sulfonic acid.

3. A graft copolymer as in Claim 1 wherein the polymerizable anionic monomer is 2-acrylamido-2-methylpropane sulfonic acid.

4. A graft copolymer as in Claim 1 wherein the polymerizable anionic monomer is 2-hydroxymethacryloxypropyl sulfonic acid.

5. A graft copolymer as in Claim 1 wherein the polymerizable anionic monomer is 2-sulfoethylmethacrylate.

References Cited

UNITED STATES PATENTS

| | | | |
|---|---|---|---|
| 3,640,925 | 2/1972 | Touzinsky et al. | 260—17.4 GC |
| 3,467,647 | 9/1969 | Benninga | 162—175 |
| 3,095,391 | 6/1963 | Brockway et al. | 260—17.4 |
| 3,506,707 | 4/1970 | Miller et al. | 260—513 |
| 3,635,857 | 1/1972 | Restaino et al. | 260—17.4 |
| 3,709,780 | 1/1973 | Slagel | 260—17.4 |

FOREIGN PATENTS

| | | | |
|---|---|---|---|
| 875,664 | 8/1961 | Great Britain | 260—17.4 |

WILLIAM H. SHORT, Primary Examiner

E. WOODBERRY, Assistant Examiner

U.S. Cl. X.R.

162—168, 175; 260—17.4 SG, 17.4 ST